Feb. 7, 1950 — L. H. FLORA — 2,496,866
FASTENING DEVICE
Filed June 18, 1947

Inventor
LAURENCE H. FLORA
By H. G. Lombard
Attorney

Patented Feb. 7, 1950

2,496,866

UNITED STATES PATENT OFFICE 2,496,866

FASTENING DEVICE

Laurence H. Flora, Cleveland, Ohio, assignor to Tinnerman Products, Inc., Cleveland, Ohio, a corporation of Ohio Application June 18, 1947, Serial No. 755,432

2 Claims. (Cl. 173—259)

This invention relates in general to improvements in fastening devices and deals, more particularly, with an improved clip type of device which is designed to be easily and quickly applied to or removed from assembled relation with an associated bolt, screw or other stud in a minimum of time and effort.

A primary object of the invention is to provide a simplified construction for a clip fastener which may be applied by a simple push-on procedure into frictional gripping contact with a bolt screw or other stud, and which otherwise may be readily removed therefrom by a simple reverse pulling operation without mutilation or distortion of the fastener so that it may be reapplied to the installation and thereafter removed and reapplied as often as may be necessary or desirable.

A further object of the invention is to provide a clip fastener of this character in the form of a terminal for electrical conductors together with means for facilitating the attachment of electrical conductors thereto.

Another object of the invention is to provide a clip of the kind described which may be used on bolts, screws, binding posts, or other studs of varying diameter with equal effectiveness.

A still further object is the provision of an improved terminal clip, coupling or connector, such as described, which enables the quick attachment or detachment of an electrical conductor to a threaded stem or binding post without the use of tools, or special equipment and which when attached, provides a highly efficient electrical connection that is not subject to accidental or unintended loosening or detachment.

Further objects and advantages of the invention and other new and useful features in the construction and arrangement thereof will be readily apparent as the following description proceeds with reference to the accompanying drawings in which like reference characters designate like parts throughout, and in which.

Referring now, more particularly, to the drawings, the invention is disclosed, by way of an illustration only, as employed in an installation of a radio antenna of the type commonly used in automobile radio sets, for example. In this relation, the clip fastener of the invention facilitates the initial installation and otherwise provides an easily and quickly attachable and detachable connection of the antenna lead wire to a binding post associated with the antenna in order that the supporting means for the antenna may be readily accessible for repair or adjustment purposes. However, it will be understood that the invention is not limited in any way to this application and use inasmuch as the improved clip device is equally adaptable to a wide range and variety of other applications and uses as employed with a bolt, screw, or other stud for fastening purposes in addition to various uses as a terminal connector for electrical installations in general.

Figure 1:
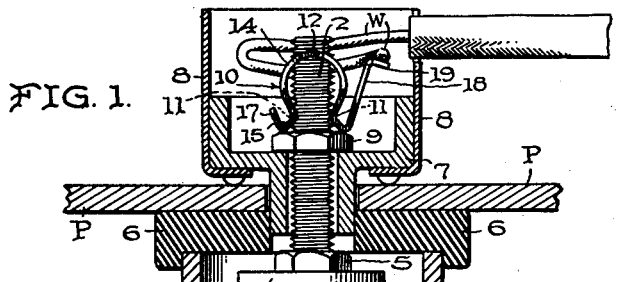
Fig. 1 is a horizontal sectional view of an installation in which one application of the improved fastener of the invention is illustrated by way of example.

As an example of an application of the invention, Fig. 1 shows an antenna rod 1 which is mounted on a panel P, such as an automobile body panel, by means of an eye bolt 2. The head of the eye bolt is rigidly joined to the antenna rod 1 and this joint is concealed by a shell 3 having openings through which said rod 1 extends. Suitable washers 4 are provided within said shell 3, and a nut 5 threaded onto the bolt shank completes the mounting means for the antenna rod. This mounting is installed on the outer surface of panel P together with a rubber washer or cushion 6 through which the bolt shank 2 extends into an opening in panel P to the rearward side of said panel. The bolt shank 2 is received in a combined bushing and washer 7 at the rearward side of the panel and said washer 7 carries an annular, cup-shaped electrical shield 8 which extends around the free end of the bolt and the associated electrical connection provided by the clip device of the invention. A nut 9 secures the mounting of the antenna rod and the clip terminal connector 10 is applied over the free end of the bolt 2 to a position adjacent said nut 9.

An electrical lead wire W is attached to the said clip 10 so that said wire may be separately connected to the binding post or bolt shank 2 rather than clamped under the nut 9. If clamped under the nut 9, the lead wire would be twisted off during tightening of said nut in securing the antenna rod with the required strength and rigidity. The use of an auxiliary nut to clamp the lead wire frequently results in an unsatisfactory connection and is otherwise a tedious, time consuming procedure in that the wire and nut must both be applied within the close quarters defined by the shield 8. By the use of the clip terminal connector of the present invention, the lead wire W may be easily and quickly connected by a simple push in applying the clip to the free end of the bolt shank 2, and conversely, the same may be readily detached by a simple pull as necessary to slip the clip from connected relation with the bolt.

The clip device 10 is a relatively simple inexpensive article of manufacture which lends itself to economical quantity production in that it may be provided at relatively low cost from ordinary sheet metal strip stock with little loss or waste of material. Any suitable sheet metal strip material may be employed, preferably of a spring metal nature such as spring steel which may be spring tempered and otherwise treated to provide the clips with the desired toughness and hardness.

Figure 2:
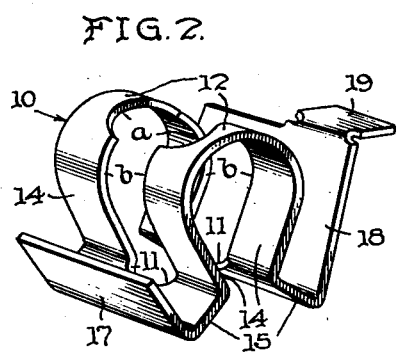
Fig. 2 is a perspective view of the clip fastener per se.
Figure 3:
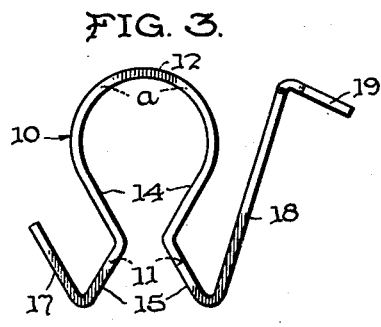
Fig. 3 is a side edge elevational view of the clip fastener.
Figure 4:
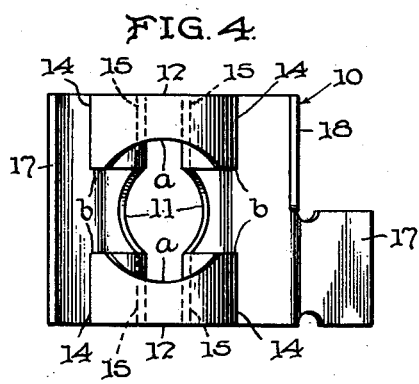
Fig. 4 is a top plan view of the clip device shown in Figs. 2 and 3.

The clip device 10 is constructed in the general design shown in Figs. 2, 3 and 4 and in forming the same, a suitable sheet metal strip or blank is provided with a lengthwise cutout area comprising a central bolt passage a and radially extending slots b at either side of said bolt passage terminating in arcuate stud gripping edges 11. Said cutout area, accordingly, provides the blank with spaced side sections 12 which when bent into the general form of an inverted U-shape, substantially as shown in Figure 3, form laterally spaced U-shaped yoke or bridge sections 12. The fastener thus formed with said U-shaped yoke or bridge sections, accordingly, defines spaced resilient body portions or spring arms 14 which are joined by intermediate bent portions and extend in the same general direction from a relatively wide spacing adjacent the bight of the U-shape to a constricted spacing adjacent the open end of the U-shaped fastener body. These spring arms or spaced body portions 14, consequently, define general bowed resilient spring jaws carrying the arcuate edge elements 11 that are adapted for gripping engagement with the shank of a bolt, screw or other stud which is passed therebetween. Adjoining said generally U-shaped body portions or spring arms 14 body portions 15 of the blank are bent outwardly in diverging relation and these body portions include the arcuate stud gripping elements 11 and otherwise define outwardly diverging guide surfaces 15 forming a flared mouth or funnel-shaped spacing between the spring arms 14 which facilitate application of the clip to the free end of a bolt or other stud.

The end portions of the blank are return bent to provide suitable flanges 17, 18 by which the clip may be manipulated in applying or removing the same from a stud. In the present example, the flange 18 is provided with a projecting tab 19 on the extremity thereof and is of such length as to extend beyond the remainder of the clip so that the lead wire W, Fig. 1, which is attached to said tab will not tangle with the clip or associated structure in the application of the clip in an installation. The lead wire W or other electrical wire is attached to the tab in any suitable manner, preferably by soldering the same to the tab or clinching the tab thereto.

Figure 5:
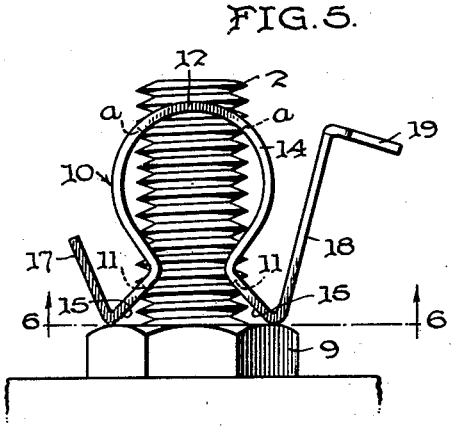
Fig. 5 shows the clip fastener in edge elevation as applied to a threaded binding post or the like as seen in Fig. 1, for example; and, Fig. 6 is a sectional view of Fig. 5 taken on line 6—6 looking in the direction of the arrows.
Figure 6:
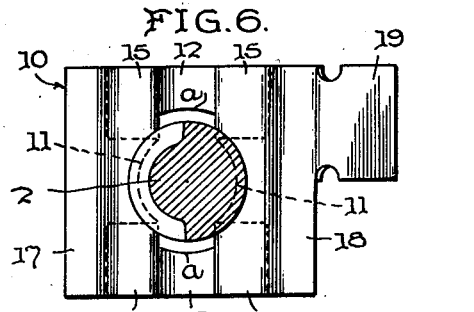

From the foregoing, it will be understood that the clip 10 may be readily applied to the terminal or binding post 2, or other bolt, screw or stud member simply by placing the diverging guide surfaces 15 of the clip over the free end of the bolt and pushing the clip axially relatively to the bolt to the operative position thereof substantially as shown in Fig. 5. In the normal untensioned relation of the clip, the arcuate stud gripping elements 11 have a spacing considerably less than the diameter of the bolt, but due to the resiliency of the spaced spring arms 14, said stud gripping elements are adapted to spread apart as necessary to admit the bolt therebetween. This is facilitated by the diverging guide surfaces 15 which cam outwardly against the free end of the bolt as pressure is exerted on the bridge or yoke portions 12 of the clip and thereby cause the spring arms 14 to expand as necessary for the bolt to pass between said arcuate stud gripping elements 11. As the clip is advanced axially relatively to the bolt or binding post 2, said arcuate stud engaging elements 11 ratchet over the thread convolutions on the bolt to the applied position of the clip substantially as shown in Figs. 1 and 5. Preferably, said arcuate stud engaging elements 11 have a contour conforming substantially to the periphery of the bolt 2 so that said stud engaging elements 11 engage the adjacent bolt thread as illustrated in Fig. 6 to provide a more positive gripping engagement with the bolt. In the case of a threadless bolt or stud, said gripping elements are adapted to bite into and become embedded in the stud shank under the resilient spring force of the bridge or yoke portions 12 of the clip to provide a positive connection with the stud.

When the clip has been advanced to its fully applied position on the bolt or stud as shown in Figs. 1 and 5, the free end of the stud extends through the oversize opening a, Figs. 2 and 4, between the bridge or yoke portions 12. The resilient disposition of the arcuate stud gripping elements 11 in the clip is such that the clip may be applied to bolts and studs of various sizes with equal effectiveness and the said oversize passage a accordingly is so designed as to accommodate any size bolt or stud to which the clip may be applied.

Removal of the clip is easily and quickly effected by a simple pull on the bridge or yoke portions 12 of the clip as necessary to cause the stud gripping elements 11 to ratchet over the bolt threads in a reverse axial direction. In an alternate procedure, the spring arms 14 of the bridge or yoke portions may be spread apart as necessary to disengage the stud gripping elements 11 from the bolt whereupon the clip may be slipped off the free end thereof in a minimum of time and effort.

The clip fastener in any form preferably is constructed of relatively thin sheet metal, the thickness of which is selected according to service requirements and the predetermined size of the parts secured. The fasteners are most effective when provided of spring metal suitably spring tempered and otherwise treated to give the desired toughness and hardness, particularly in the case of devices which are used in installations where extreme vibratory motion takes place. A cheap but effective fastener may be provided from cold rolled metal, such as cold rolled steel, which is untempered but of a spring metal nature and capable of providing an effective and reliable clip fastener adapted for a long period of satisfactory service and use.

While the invention had been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning, and range of equivalency of the claims intended to be embraced therein.

What is claimed is:

1. A terminal connector clip comprising a generally U-shaped sheet metal body providing a pair of spring arms extending in the same general direction and bent intermediately inwardly toward each other to provide constricted portions adjacent the open end of the generally U-shaped body, the bight of said U-shaped body having a stud passage and each of said spring arms having a slot extending from said stud passage and terminating in its constricted portion to define a stud engaging element, said spring arms being further bent adjoining said constricted portions to provide outwardly diverging guide portions adapted to cam outwardly over the end of a stud to permit passage of the stud between said constricted portions into engagement with said stud engaging elements, and return bent flanges adjoining said diverging guide portions extending generally outwardly and upwardly therefrom, one of said flanges having a tab for attaching an electrical wire to the clip and being of sufficient length to support said wire against possible tangling with the remainder of the clip.

2. A clip comprising a generally U-shaped sheet metal body providing a pair of spring arms extending in the same general direction and bent intermediately inwardly toward each other to provide constricted portions adjacent the open end of the generally U-shaped body, the bight of said U-shaped body having a stud passage and each of said spring arms having a slot extending from said stud passage and terminating in its constricted portion to define a stud engaging element, said spring arms being further bent adjoining said constricted portions to provide outwardly diverging guide portions adapted to cam outwardly over the end of a stud to permit passage of the stud between said constricted portions into engagement with said stud engaging elements.

LAURENCE H. FLORA.

REFERENCES CITED

The following references are of record in the file of this patent:

UNITED STATES PATENTS

| Number | Name | Date |
|---|---|---|
| 842,771 | Cove | Jan. 29, 1907 |
| 1,363,350 | Recker | Dec. 28, 1920 |
| 1,514,928 | Rabezzana | Nov. 11, 1924 |
| 1,564,761 | Daiker | Dec. 8, 1925 |
| 2,430,555 | Burke | Nov. 11, 1947 |

FOREIGN PATENTS

| Number | Country | Date |
|---|---|---|
| 28,162 | Austria | Sept. 25, 1907 |
| 334,865 | Great Britain | of 1930 |
| 602,430 | Germany | Sept. 10, 1934 |